(12) United States Patent
Abadie et al.

(10) Patent No.: US 10,598,817 B2
(45) Date of Patent: Mar. 24, 2020

(54) LOCAL LAYER GEOMETRY ENGINE WITH WORK ZONE GENERATED FROM BUFFER DEFINED RELATIVE TO A WELLBORE TRAJECTORY

(71) Applicant: SCHLUMBERGER TECHNOLOGY CORPORATION, Sugar Land, TX (US)

(72) Inventors: Joan Abadie, Viols-le-Fort (FR); Adrien Chassard, Grabels (FR); Mohammad Taghi Salehi, Grabels (FR); David Maggs, Stonehouse (GB); Shahzad Asif, Richmond, TX (US); Christopher Edward Morriss, Sugar Land, TX (US); Koji Ito, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 631 days.

(21) Appl. No.: 14/933,768

(22) Filed: Nov. 5, 2015

(65) Prior Publication Data

US 2016/0130916 A1  May 12, 2016

Related U.S. Application Data

(60) Provisional application No. 62/076,219, filed on Nov. 6, 2014.

(51) Int. Cl.
*G01V 99/00* (2009.01)
*G01V 1/50* (2006.01)
(Continued)

(52) U.S. Cl.
CPC .................... *G01V 99/005* (2013.01)

(58) Field of Classification Search
CPC ... E21B 41/0092; E21B 47/00; G06F 17/5009
(Continued)

(56) References Cited

U.S. PATENT DOCUMENTS

| 6,206,108 | B1 * | 3/2001 | MacDonald | ............ E21B 44/00 |
| | | | | 175/24 |
| 6,438,493 | B1 * | 8/2002 | West | ........................ G01V 1/32 |
| | | | | 702/2 |

(Continued)

FOREIGN PATENT DOCUMENTS

| WO | 2010/138137 A1 | 12/2010 |
| WO | 2011/149460 A1 | 12/2011 |

OTHER PUBLICATIONS

"Seismic Volume Visualization for Horizon Extraction", (2010).*
(Continued)

*Primary Examiner* — Bo Fan

(57) ABSTRACT

A method, apparatus, and program product utilize a buffer defined relative to a wellbore trajectory to generate a work zone around a wellbore for use in connection with formation modeling. In some embodiments, for example, a closed curve such as a non-rectangular, polygonal work zone may be defined around a wellbore based upon a buffer that extends generally transverse to the trajectory of a length of a wellbore a predetermined distance. In addition, boundaries may be defined in a work zone to effectively split the work zone into multiple closed curves or polygons in response to user editing, e.g., to create one or more subsurface layers in the work zone. In such instances, points defining a subsurface layer may be shared by adjacent layers such that editing of such points will affect each of the layers sharing such points.

19 Claims, 11 Drawing Sheets

(51) Int. Cl.
*G01V 3/15* (2006.01)
*G01V 3/38* (2006.01)

(58) Field of Classification Search
USPC .............................. 703/10; 707/169; 702/182
See application file for complete search history.

(56) References Cited

U.S. PATENT DOCUMENTS

| | | | | |
|---|---|---|---|---|
| 6,516,898 B1* | 2/2003 | Krueger | .................... | E21B 4/18 175/230 |
| 6,560,540 B2* | 5/2003 | West | ........................ | G01V 1/32 702/14 |
| 6,907,392 B2* | 6/2005 | Bennis | .................... | G06T 17/20 702/11 |
| 7,031,841 B2* | 4/2006 | Zazovsky | ............... | E21B 47/06 166/250.02 |
| 7,277,796 B2* | 10/2007 | Kuchuk | .................. | E21B 49/00 702/13 |
| 7,516,055 B2* | 4/2009 | Strebelle | .................. | G01V 1/30 703/10 |
| 7,558,716 B2* | 7/2009 | Hammond | ............ | E21B 49/008 702/12 |
| 7,778,810 B2* | 8/2010 | Flandrin | .................. | G06T 17/20 703/10 |
| 7,788,074 B2* | 8/2010 | Scheidt | .................... | E21B 43/00 703/10 |
| 7,983,883 B2* | 7/2011 | Chen | ........................ | E21B 43/00 703/10 |
| 8,047,286 B2* | 11/2011 | Zazovsky | ............... | E21B 49/10 166/100 |
| 8,078,437 B2* | 12/2011 | Wu | ........................ | G01V 11/00 703/10 |
| 8,120,357 B2* | 2/2012 | Wichers | .................. | G01V 11/00 324/303 |
| 8,150,669 B2* | 4/2012 | Cacas | .................... | G01V 99/00 345/423 |
| 8,214,187 B2* | 7/2012 | Mouton | .................. | G06T 17/20 702/12 |
| 8,396,699 B2* | 3/2013 | Maliassov | .............. | G01V 11/00 703/10 |
| 8,892,412 B2* | 11/2014 | Ghayour | .................. | G01V 1/30 166/250.01 |
| 8,905,155 B1* | 12/2014 | Berger, III | .............. | E21B 47/10 166/250.01 |
| 9,261,391 B2* | 2/2016 | Berger, III | .............. | E21B 44/00 |
| 9,366,772 B2* | 6/2016 | Imhof | .................... | G01V 1/306 |
| 9,582,931 B2* | 2/2017 | Wang | ...................... | G06T 17/05 |
| 9,618,652 B2* | 4/2017 | Weng | ................... | G01V 99/005 |
| 9,677,393 B2* | 6/2017 | Morris | .................. | E21B 43/267 |
| 9,703,006 B2* | 7/2017 | Stern | ...................... | G01V 11/00 |
| 9,835,746 B2* | 12/2017 | Yan | ........................ | G01V 1/282 |
| 9,890,616 B2* | 2/2018 | Pabon | .................... | E21B 43/26 |
| 10,101,498 B2* | 10/2018 | Berard | ................... | G01V 99/005 |
| 2002/0029883 A1* | 3/2002 | Vinegar | ................ | E21B 17/003 166/250.15 |
| 2004/0245182 A1* | 12/2004 | Appleford | ............. | E21B 43/121 210/739 |
| 2006/0081378 A1* | 4/2006 | Howard | .................. | E21B 43/12 166/372 |
| 2010/0044034 A1* | 2/2010 | Bailey | ................. | E21B 47/1015 166/253.1 |
| 2016/0216405 A1 | 7/2016 | Rasmus et al. | | |
| 2016/0218104 A1* | 7/2016 | Wen | ...................... | H01L 21/845 |
| 2018/0299573 A9* | 10/2018 | Pan | .......................... | G01V 1/28 |

OTHER PUBLICATIONS

Xia et al., "Application of 3D fine seismic interpretation technique in Dawangzhuang Area, Bohai Bay Basin, Northeast China", (2013).*
Davies et al., "A vision for 3D seismic technology and visualization", 3D Seismic Technology and Visualization (2005) pp. 1483-1486.*
Masaferro et al., "3D visualization of carbonate reservoirs", The Leading Edge (2003) pp. 18-25.*
Combined Search &Examination Report for the equivalent UK patent application 1519405.3 dated Apr. 28, 2016.

* cited by examiner

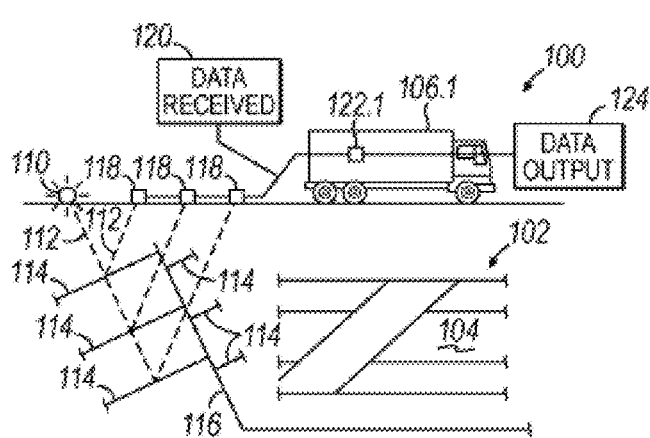
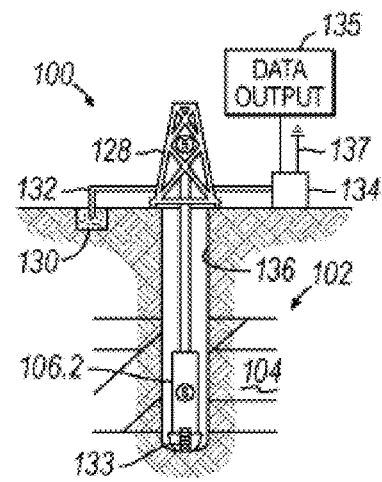
FIG. 2A  FIG. 2B
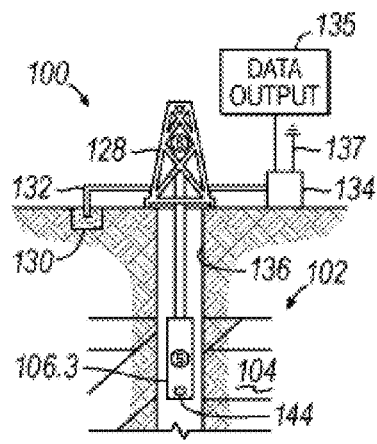
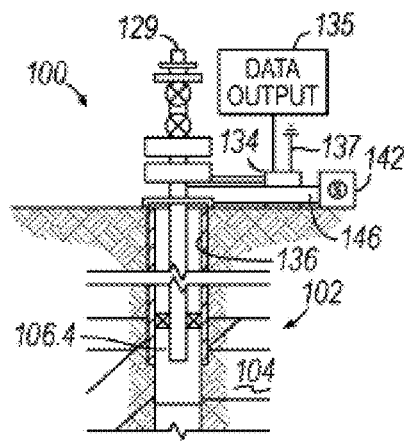
FIG. 2C  FIG. 2D

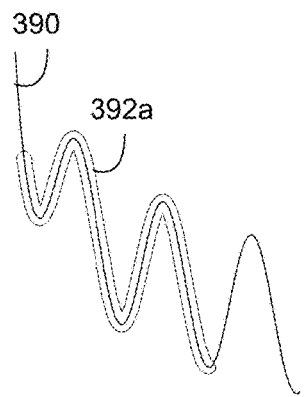 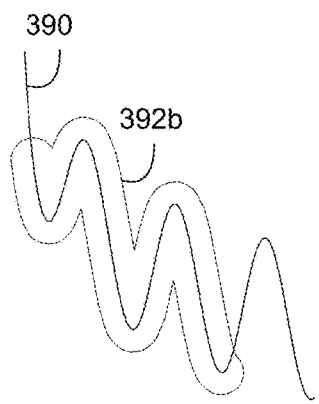 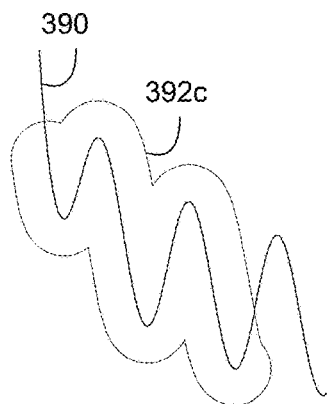
FIG. 9A      FIG. 9B      FIG. 9C
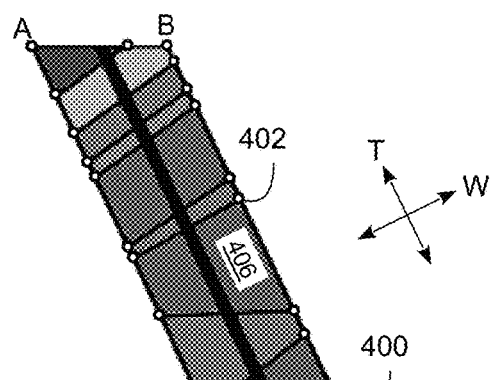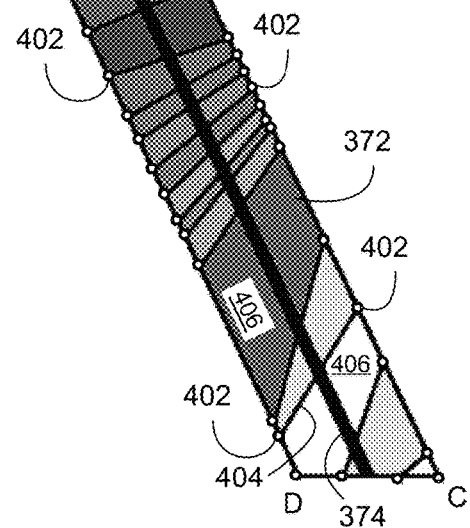
FIG. 10

LOCAL LAYER GEOMETRY ENGINE WITH WORK ZONE GENERATED FROM BUFFER DEFINED RELATIVE TO A WELLBORE TRAJECTORY

CROSS-REFERENCE TO RELATED APPLICATIONS

This application claims the filing benefit of U.S. Provisional Patent Application Ser. No. 62/076,219 filed on Nov. 6, 2014, which is incorporated by reference herein in its entirety.

BACKGROUND

Formation modeling is used to model the locations of the boundaries between subsurface layers and layers properties in a subsurface formation in close proximity to a wellbore. Formation modeling may be an interactive process whereby a user interacts with a computer model, e.g., through a graphical user interface, to select the locations and properties of subsurface layers in a subsurface formation.

Formation modeling is generally based upon sensor data collected from one or more types of sensors that are placed in a wellbore either during drilling of the wellbore or after drilling, and as such, the data is generally focused in an area in close proximity to the wellbore itself. While some sensors are capable of collecting data that may extend several feet or meters from a wellbore, other sensors collect much shallower data, e.g., within 6 to 24 inches or less around a wellbore. Regardless, the distances within which all such sensors collect data are orders of magnitude smaller than the size of a subsurface formation or even the lengths of the wellbores from which the data is collected, as wellbores may extend thousands of feet or meters below the surface.

Generally, when performing formation modeling, a user is presented with a two or three dimensional view of the wellbore as well as additional depictions of relevant sensor data, and the user interprets that data and selects locations around the wellbore to define points and/or line segments representing boundaries between adjacent subsurface layers. A work zone may be defined around a wellbore to enable a user to interact with a small region around the wellbore. A work zone is generally rectangular in shape, however, and it has been found that particularly for modeling from sensor data that is shallow in nature, formation modeling is complicated by the use of such a rectangular work zone because the work zone may necessarily include regions that are spaced beyond the range of the sensors used to collect the sensor data, and further, because artifacts may be introduced as a result of automated efforts to define the boundaries between adjacent subsurface layers.

SUMMARY

Consistent with one aspect of the invention, a method may model a subsurface formation using sensor data collected along a wellbore extending through the subsurface formation by determining a buffer along a length of the wellbore, the buffer defined by a closed curve surrounding the length of the wellbore, generating a work zone from the determined buffer for display on a computer display, visualizing a region of the subsurface formation along the length of the wellbore by populating the work zone using sensor data collected along the length of the wellbore, visualizing boundaries between a plurality of layers in the region of the subsurface formation in the work zone, and building a computer model of the region of the subsurface formation based upon positions of the boundaries visualized in the work zone.

In some embodiments, the closed curve comprises a polygon, and the work zone comprises a polygonal work zone. In addition, in some embodiments, determining the buffer includes determining the buffer to extend a predetermined distance generally transverse to a trajectory of the wellbore, while in some embodiments, the predetermined distance corresponds to a range of a sensor used to collect the sensor data. Further, in some embodiments, the polygonal work zone is non-rectangular.

In addition, in some embodiments, visualizing the boundaries includes visualizing a first boundary between first and second layers among the plurality of layers. In some embodiments, the first boundary is defined by a plurality of points, and visualizing the first boundary includes visualizing the plurality of points defining the first boundary in the work zone. In some embodiments, visualizing the first boundary further includes visualizing at least one edge extending between at least one pair of the plurality of points, and in some embodiments, the first and second layers are respectively defined by first and second polygons partitioned from the polygon for the work zone, and the plurality of points in the first boundary are shared by the first and second polygons. Some embodiments further include updating the first and second polygons defining the first and second layers in response to user input that moves a first point among the plurality of points, and some embodiments further include updating the first and second polygons defining the first and second layers in response to user input that deletes a first point among the plurality of points. In some embodiments, updating the first and second polygons in response to user input that deletes the first point includes merging the first and second polygons and thereby merging the first and second layers.

In addition, some embodiments include creating a new boundary in response to user input, and in some embodiments, the new boundary splits the second polygon defining the second layer, and creating the new boundary further includes resizing the second polygon and splitting a third polygon from the second polygon to define a third layer among the plurality of layers. In some embodiments, at least one edge of the first polygon extends along an edge of the polygonal work zone.

Some embodiments further include automatically generating the boundaries between the plurality of layers based upon the sensor data collected along the length of the wellbore. In addition, in some embodiments, the computer model includes one or more attributes, at least one of the one or more attributes is a layer attribute, a boundary attribute, a segment attribute or a point attribute, each of the plurality of layers includes a value for each of the one or more attributes, automatically generating the boundaries includes automatically assigning the value for each of the one or more attributes to each of the plurality of layers based upon the sensor data collected along the length of the wellbore, populating the work zone using the sensor data collected along the length of the wellbore includes visualizing the plurality of layers using colors, shades or patterns correlated to the assigned values of at least one of the one or more attributes, and the values of the one or more attributes assigned to each of the plurality of layers are user editable. Further, in some embodiments, generating the work zone, visualizing the region of the subsurface formation and visualizing the boundaries are performed by a local layer geometry engine.

In addition, some embodiments include an apparatus with at least one processing unit and program code configured upon execution by the at least one processing unit to perform any of the aforementioned methods. Some embodiments also include a program product including a computer readable medium and program code stored on the computer readable medium and configured upon execution by at least one processing unit to perform any of the aforementioned methods.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 2A-2D illustrate simplified, schematic views of an oilfield having subterranean formations containing reservoirs therein in accordance with implementations of various technologies and techniques described herein.

FIGS. 9A-9C illustrate example buffer polygons at different distances or radii around an example borehole trajectory in accordance with implementations of various technologies and techniques described herein.

FIG. 10 illustrates an example visualization of a polygonal work zone corresponding to a portion of the subsurface formation represented in FIG. 8.

DETAILED DESCRIPTION

The embodiments disclosed herein provide a method, apparatus, and program product that utilize a buffer defined relative to a wellbore trajectory to generate a work zone around a wellbore for use in connection with formation modeling. In some embodiments, for example, a closed curve such as a non-rectangular, polygonal work zone may be defined around a wellbore based upon a buffer that extends generally transverse to the trajectory of a length of a wellbore a predetermined distance. In addition, boundaries may be defined in a work zone to effectively split the work zone into multiple closed curves or polygons in response to user editing, e.g., to create one or more subsurface layers in the work zone. In such instances, points defining a subsurface layer may be shared by adjacent layers such that editing of such points will affect each of the layers sharing such points.

Prior to a discussion of formation modeling utilizing such a work zone, however, a discussion of an example hardware and software embodiment, as well as of oilfield operations in general, will be provided.

Hardware and Software Environment

Figure 1:
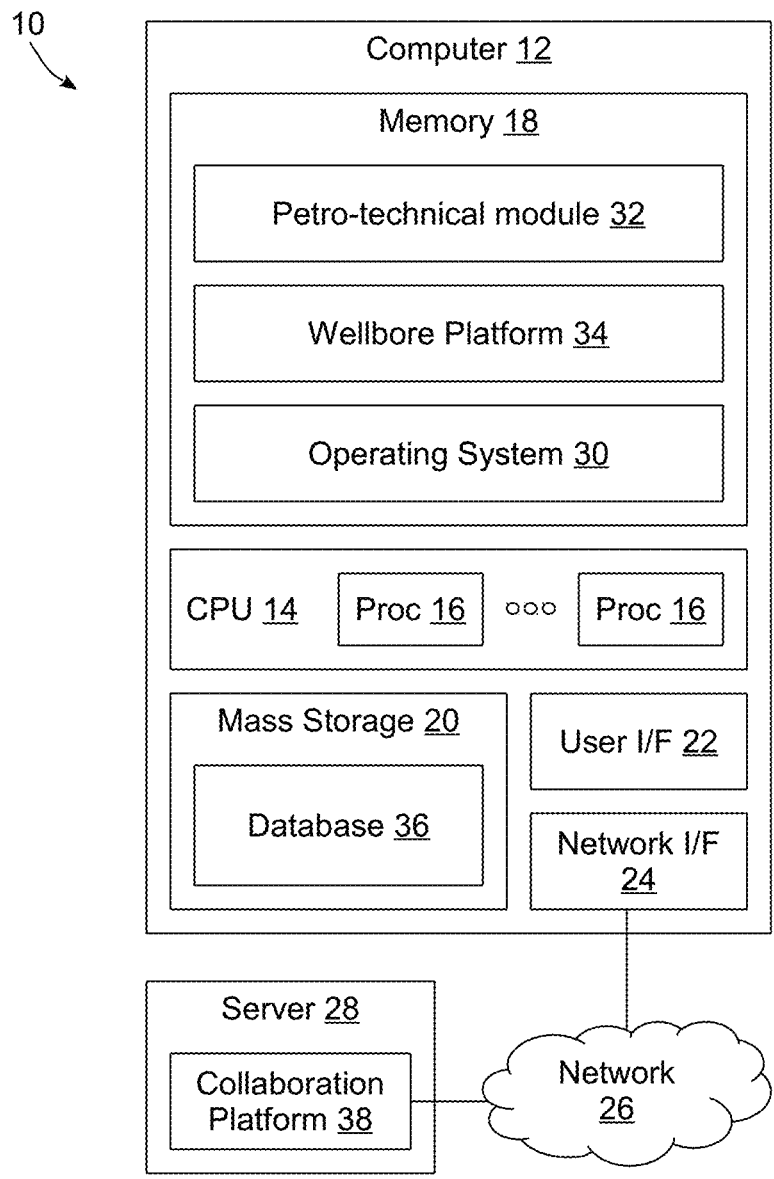
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc.

A computer 12 generally operates under the control of an operating system 30 and executes or otherwise relies upon various computer software applications, components, programs, objects, modules, data structures, etc. For example, a petro-technical module or component 32 executing within a wellbore platform 34 may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12.

In one non-limiting embodiment, for example, petro-technical module 32 may be implemented as a 3D petro-physics (3DP) module, wellbore platform 34 may implemented as the Techlog software platform, while collaboration platform 38 may be implemented as the STUDIO E&P KNOWLEDGE ENVIRONMENT platform, all of which are available from Schlumberger Ltd. and its affiliates. It will be appreciated, however, that the techniques discussed herein may be utilized in connection with other platforms and environments, so the invention is not limited to the particular software platforms and environments discussed herein.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
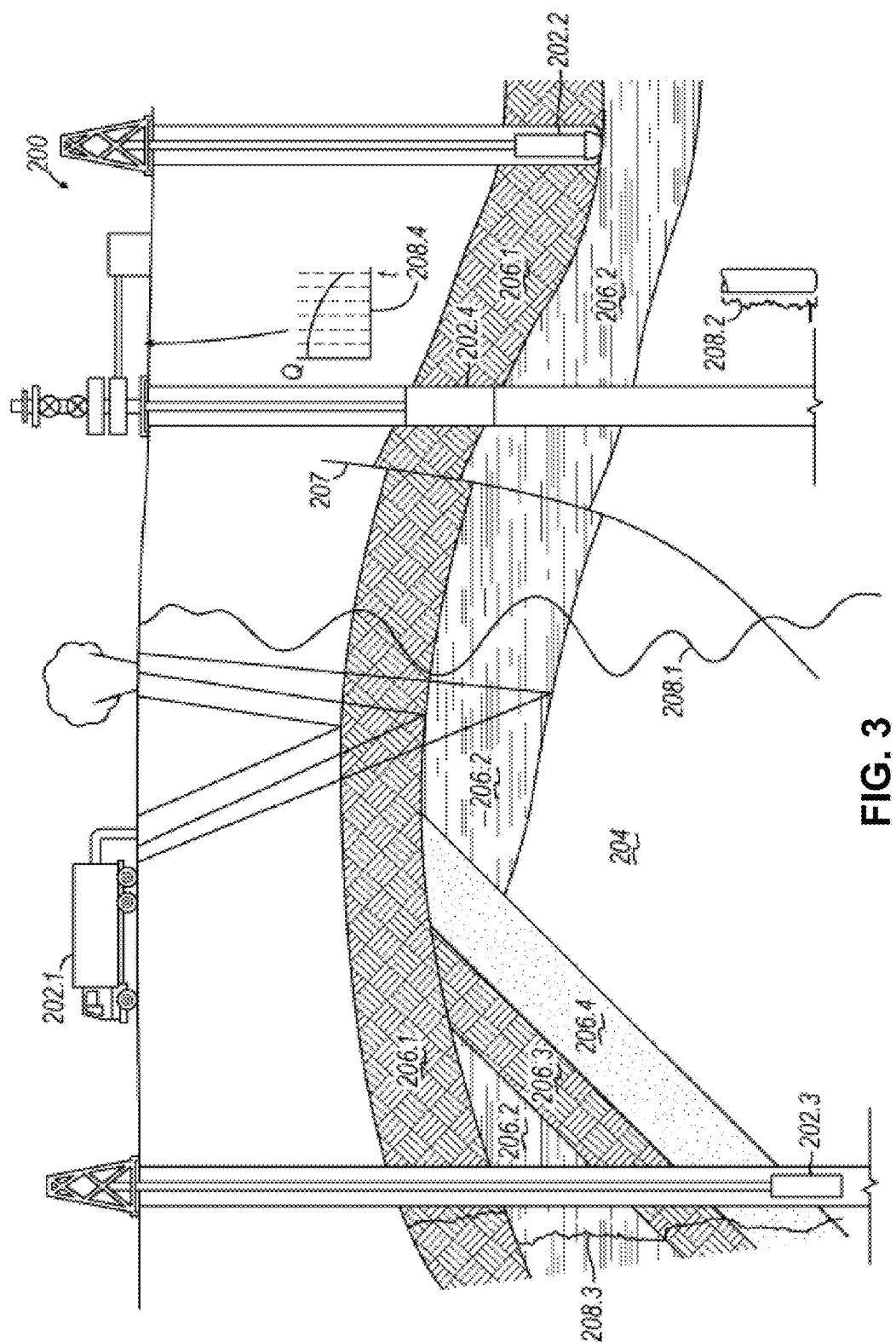
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
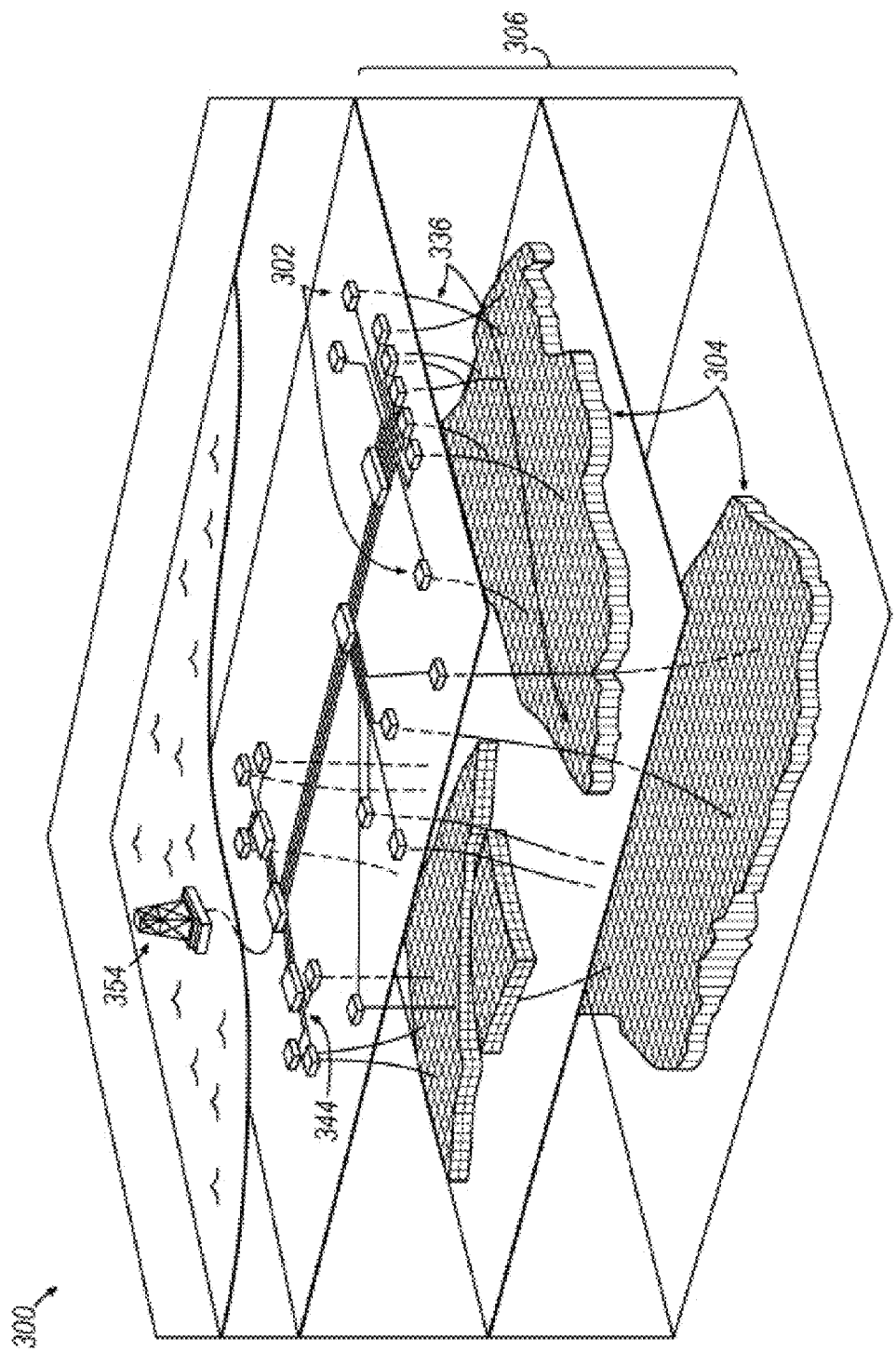
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Local Layer Geometry Engine Incorporating Closed Curve or Polygonal Work Zone

Returning briefly to FIG. 1, modeling the subsurface is one feature of petro-technical module 32. Such modeling may be based upon sensor data that is collected from one or more sensors that are positioned in a wellbore generally during and/or after drilling the wellbore. The sensor data may include, for example, borehole geophysical or "log" measurements that represent a property or attribute of the formation. These measurements include but are not limited to, natural gamma ray, resistivity, density, neutron porosity, velocity, nuclear magnetic resonance porosity, sigma, spectroscopy, sonic velocity, etc. The properties or attributes represented by these measurements may be determined for each earth volume, also referred to herein as a layer, using a model-compare-update workflow, by automatic inversions or by a combination of the two. These properties or attributes may then be used for subsequent petrophysical evaluations (e.g., hydrocarbon volume, permeability, etc.) rather than the measured logs which respond to the geometrical mix of layer or volume properties rather than the property of a single layer or volume due to the fact that the measurement volumes of log measurements can exceed the scale at which the formation properties are changing. The properties or attributes of the earth volumes or layers may then be used in property modeling and up-scaling workflows in order to perform more accurate reservoir flow simulations. Because of the increased accuracy, the resulting modeled reservoir flow simulations generally result in a better match to actual reservoir volumes and flow rates.

When modeling earth volumes or layers with shallow reading sensors (e.g., density measurements, or other measurements that are around 6 to 24 inches from the borehole into the subsurface), the principal zone of interest is that near the wellbore, and in order to focus on this relevant zone, a local layer geometry engine consistent with the invention and incorporated into petro-technical module 32 may be used to build a work zone around the wellbore and provide features for a user to model the layers of the subsurface, including, for example, a closed curve or polygon splitting feature for use in adding new formation layers to a model of the subsurface formation. A work zone, in this regard, may be considered to be an area where one or more layers in a subsurface formation may be modeled using a geometry engine.

Figure 5:
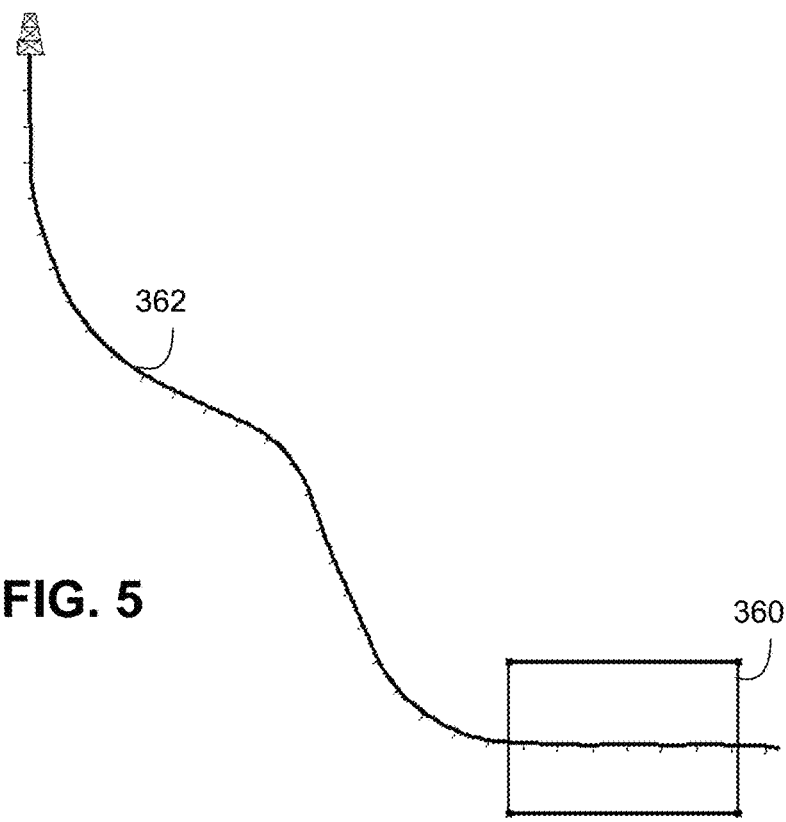
FIGS. 5 and 6 respectively illustrate rectangular and polygonal work zones that may be used in global and local layer modeling, with FIG. 6 illustrating a non-rectangular polygonal work zone.

Conventional geometry engines used to build subsurface layers have generally been limited by requirements that work zones be rectangular, and that newly added layers split entire work zones, rather than only a relevant polygon. FIG. 5, for example, illustrates an example rectangular work zone 360 for a wellbore 362 based upon global formation or layer modeling using a conventional geometry engine. In some embodiments, global formation or layer modeling may be used to model more than about 10 feet from the wellbore, while local formation or layer modeling may be used to model closer to the wellbore (e.g., less than few feet from the wellbore).

Figure 6:
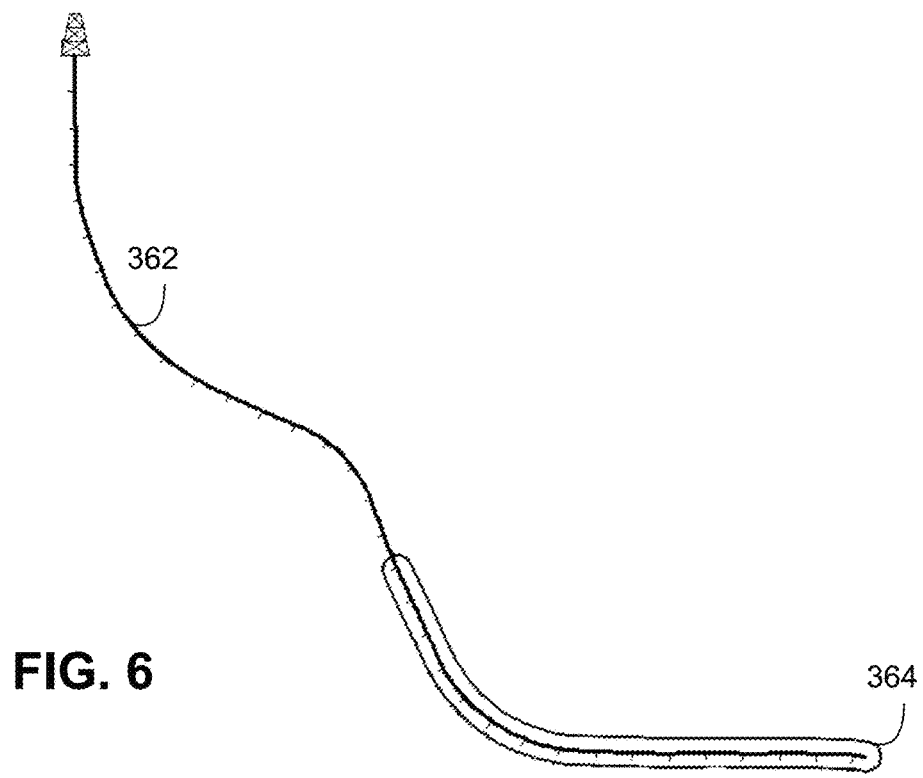

Embodiments consistent with the invention, on the other hand, may be used to build a work zone around the wellbore trajectory using a closed curve or polygonal approach to build and edit subsurface layer geometry. In particular, embodiments consistent with the invention may utilize a buffer that is defined relative to the trajectory of a length of a wellbore to generate a work zone that is limited to a region of a subsurface formation that is proximate to the length of the wellbore, and that has associated sensor data collected by one or more sensors that are placed in the wellbore either during drilling of the wellbore or after drilling. For example, FIG. 6 illustrates a work zone 364 for the same wellbore 362 as is illustrated in FIG. 5, which surrounds a length of the wellbore and is based upon a buffer consistent with the invention.

A buffer consistent with the invention, in particular, may extend a predetermined distance generally transverse to a trajectory of the wellbore for at least a length of the wellbore. In some embodiments, the predetermined distance may be based on the distance that sensor data collected using a wellbore sensor extends into the subsurface formation. In some embodiments, the distance may be based on the actual region for which collected sensor data exists, while in some embodiments, the distance may be based upon a characteristic of the sensor itself (e.g., if a particular sensor is known to produce reliable readings within 3 inches from a wellbore). In addition, in some instances, the predetermined distance may be defined in units of time, rather than on units of length, e.g., for sensors such as borehole seismic sensors that measure reflected waveforms. Further, at least when the distance is based on the actual region for which collected sensor data exists, the predetermined distance for a buffer may vary over the length of the wellbore.

A buffer consistent with the invention may be used to generate a type of work zone that is referred to herein as a closed curve or a polygonal work zone. As is generally understood in the art, a closed curve is a two dimensional shape having a perimeter defined by one or more edges or line segments. The perimeter of a closed curve may also be defined by one or more points joining together adjacent edges or line segments, and it will be appreciated that any edges or line segments of a closed curve may be linear (straight) or non-linear (curved). A polygon is a type of closed curve where all of the edges or linear, and as such, is generally a two dimensional closed shape defined by three or more points joined by three or more linear edges.

The embodiments discussed hereinafter focus on the use of a polygonal work zone, as well as the definition of layers using polygons consisting of points and linear or straight edges or line segments. It will be appreciated by those of ordinary skill in the art having the benefit of the instant disclosure, however, that in other embodiments consistent with the invention, closed curves including one or more non-linear or curved edges or line segments may be used to define work zones and/or the layers of a subsurface formation. Therefore, the invention is not limited to use with polygonal work zones and/or polygon definitions of subsurface layers, and it would be within the skill of one of ordinary skill in the art having the benefit of the instant disclosure to adapt the herein-described techniques for use with non-polygon closed curves.

In addition, it will be appreciated that a closed curve or polygonal work zone is also characterized as not being restricted to a rectangular shape. Thus, while an individual closed curve or polygonal work zone may be rectangular due to the fact that the trajectory of a length of a particular wellbore defines a buffer that in that instance forms a rectangular polygon, a closed curve or polygonal work zone is not constrained to only rectangular shapes.

Figure 7:
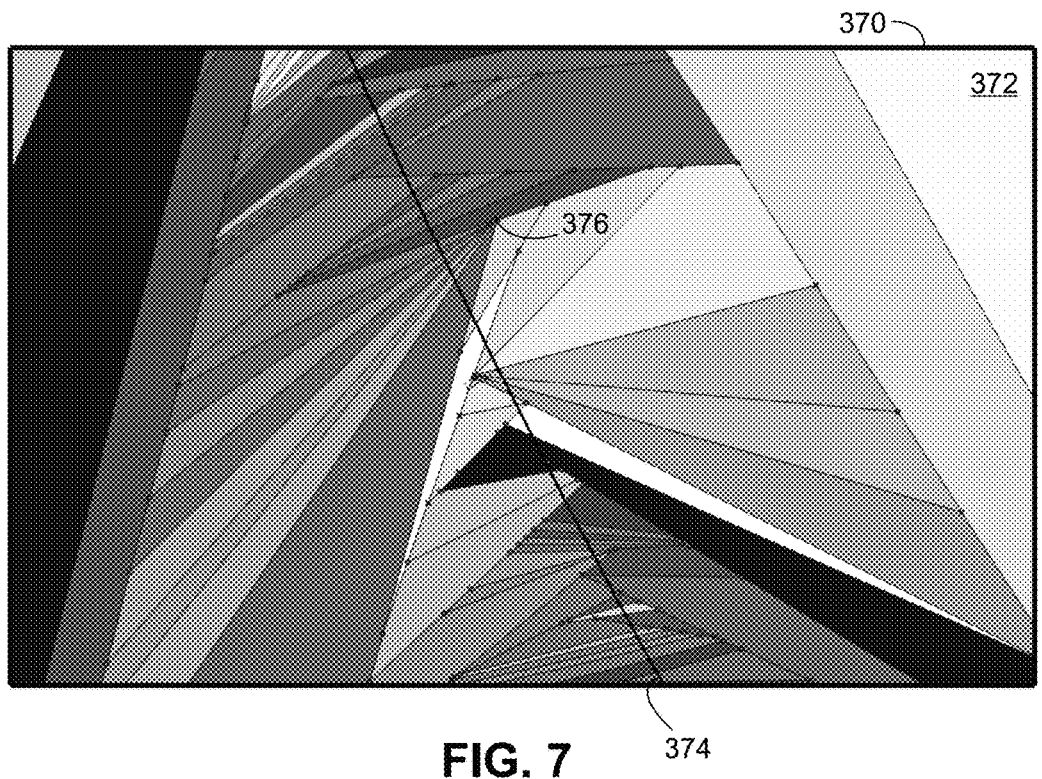
FIGS. 7 and 8 illustrate automatic layer generation performed within a work zone, with FIG. 8 illustrating automatic layer generation when using a buffer in accordance with implementations of various technologies and techniques described herein.

Among other benefits, the use of a closed curve or polygonal work zone can be used to reduce the generation of undesirable artifacts in connection with automatic high resolution data modeling, such as is used in a "compute high angle model" operation such as is discussed in U.S. Provisional Application No. 62/107,899, filed Jan. 26, 2015, which is incorporated by reference herein. FIG. 7, for example, illustrates a rectangular work zone 370 that may be used to model a region 372 of a surface formation proximate a wellbore 374. Layers may be modeled using the aforementioned compute high angle model operation based in part determining dips crossing the trajectory of wellbore 374 using sensor data collected from a wellbore sensor, and then populating the areas between the dips with attribute values based upon the collected sensor data. The attribute values are generally associated with different shades, colors or patterns in a visualization to distinguish the areas between the dips to represent an interpretation of the layer geometry from the sensor data. When the dips are projected beyond the area immediately proximate the wellbore where the sensor data has been collected, however, layer boundaries intersect, e.g., as shown at 376. Such intersections generally introduce artifacts that complicate the modeling process.

Figure 8:
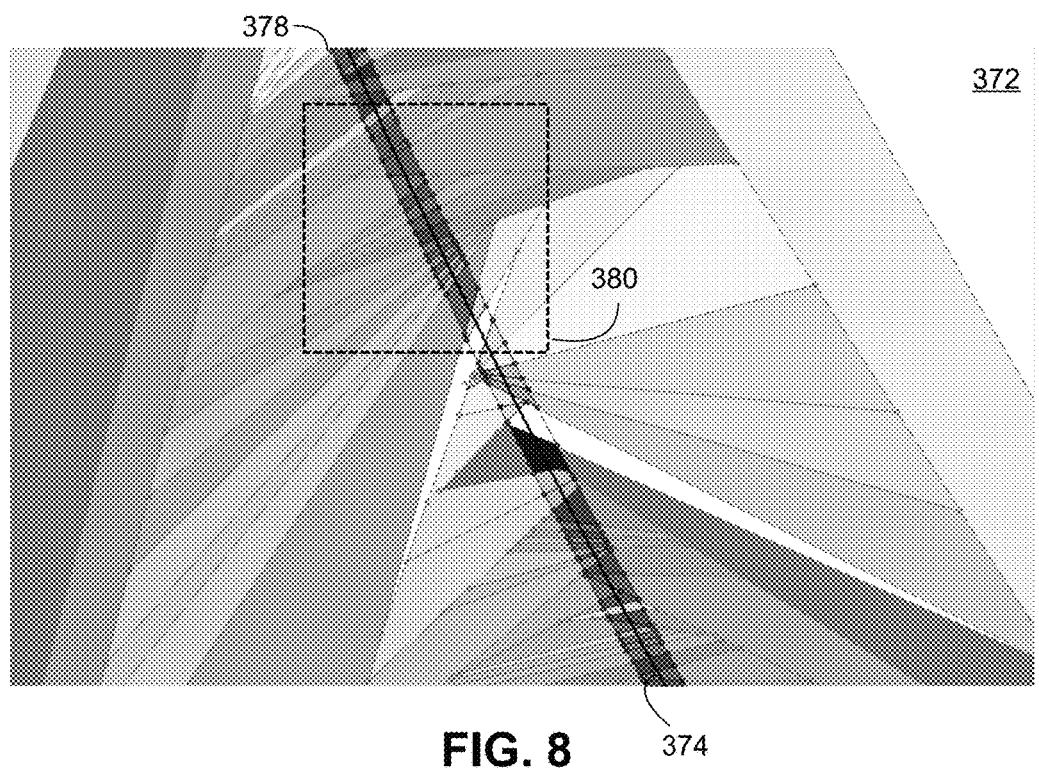

In embodiments consistent with the invention, on the other hand, a buffer may be defined around a wellbore to extend a predetermined distance generally transverse to the wellbore trajectory. Thus, as shown in FIG. 8, a closed curve or polygonal work zone 378 may be used in lieu of work zone 370 to limit the distance that dips are projected from the trajectory of wellbore 374 based upon the collected sensor data in a compute high angle model operation. As a result, intersections between layers that would otherwise be generated from such an operation were a larger work zone used are not introduced into the model, and the presence of associated artifacts is reduced.

Returning again to FIG. 1, in the illustrated embodiment, module 32 may incorporate an interactive process to enable a user to build and/or modify subsurface layers model in a 2D projected visualization of a wellbore trajectory. Such interactive process may be based in some embodiments on an initial definition of layer boundaries generated using an automated high resolution data modeling operation such as the aforementioned compute high angle model operation. In other embodiments, however, a user may create and modify layer boundaries manually and without the assistance of an automated operation. The local layer geometry modeling workflow may, in some embodiments, supplement a global layer modeling workflow in order to build a local layer computer model of a region of a subsurface formation. A local layer computer model may be separate from a global layer model in some embodiments, although the local and global layers may be correlated in some embodiments to share one or more main layers.

In the illustrated embodiment, however, regardless of whether or not an automated operation is performed, a local layer geometry engine incorporated into module 32 may incorporate a buffer computation feature that may be used to enable the creation of a closed curved or polygonal work zone around a wellbore trajectory. The creation of a work zone may be initiated, for example, in response to user input, or may be automatically performed, e.g., in response to user selection of a particular section or length of a wellbore.

In the illustrated embodiment, a local layer geometry work zone may be generated by an algorithm using a buffer technique such as a dilation mathematical morphology operation, and may be based upon the trajectory of a particular section, or length, of the wellbore to be modeled. Other algorithms, such as inflation algorithms, may also be used in other embodiments. A buffer, as noted above, may be considered to be a closed curve or polygon enclosing the wellbore trajectory at a specified distance generally transverse to the wellbore trajectory. In addition, in some embodiments, a user may be permitted to tune the distance of the buffer algorithm in order to change the work zone. In some embodiments, for example, tuning the distance may be performed in order to match sensor range, i.e., the range of a sensor used to collect formation modeling data (i.e., the sensor data that is displayed during modeling and used in interpretation). FIGS. 9A-9C, for example, illustrate, for the same wellbore trajectory 390, three different work zones 392a, 392b and 392c based on buffers tuned to different predetermined distances.

In the illustrated embodiment, a local geometry modeling workflow relies in part on a visualization of a work zone displayed on a computer display, e.g., polygonal work zone 400 of FIG. 10, which corresponds generally to a portion of work zone 378 illustrated in box 380 of FIG. 8. Visualization, in this regard, may refer to the control of a computer display to display a visualized entity in some embodiments, while in other embodiments, visualization may include generating data that may be interpreted or otherwise used by another computer or device to control a computer display to display a visualized entity. As such, while visualization in many embodiments may primarily incorporate displaying graphical information on a computer display, visualization may also include in some embodiments activities such as generating HTML code, image data or other data that is communicated over a network to a remote computer for controlling that computer to displaying graphical information on that computer's display.

Work zone 400 surrounds a length of wellbore 374 and extends a predetermined distance from the wellbore in a generally transverse direction W relative to the trajectory T of the wellbore, and has a non-rectangular shape defined by points A, B, C and D. Boundaries between layers may be defined by a plurality of points 402 and may be visualized in some embodiments by visualizing both the points as well as edges or line segments 404 extending therebetween within the visualized work zone.

Figure 11:
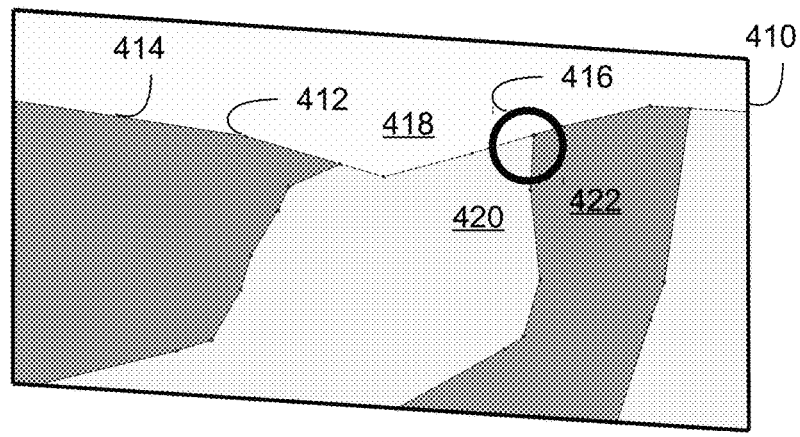
FIGS. 11 and 12 respectively illustrate local and global layer modeling techniques, with FIG. 11 further illustrating the sharing of points by multiple polygons, and with FIG. 12 illustrating a non-polygonal approach in which polygons do not share points.
Figure 12:
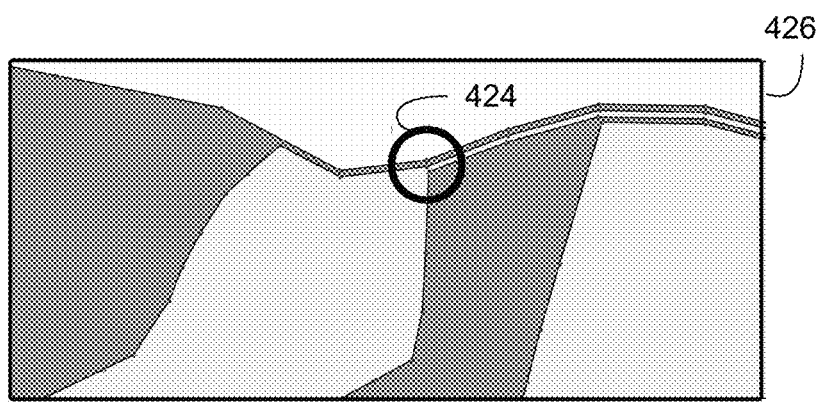

In addition, in the illustrated embodiment, layers 406 may be defined by boundaries between polygons, thereby allowing layers to be defined that lie on one or more other layers and share boundaries therewith, and editing a point shared by many boundaries may edit each of the boundaries sharing the point. FIG. 11, for example, illustrates at 410 a polygonal approach that may be used in connection with local layer modeling in some embodiments of the invention. With this approach, boundaries are defined by points 412 that may be shared by multiple boundaries, and visualized using edges 414 extending between points 412. Therefore, as shown at 416, multiple polygons (e.g., polygons 418, 420 and 422) may share points in polygonal work zone 410. In contrast, with a non-polygonal approach, e.g., as is illustrated at 424 a work zone 426 in FIG. 11 (which may be used, for example, in global layer modeling), duplicated layer points may exist and may be separately manipulated, resulting potentially in artifacts and otherwise complicating layer modeling.

When modeling using a local layer geometry engine consistent with the invention, new layers may be created in some embodiments by initially creating a polygonal work zone (referred to herein as a base polygon) in the manner discussed above, then adding one or more layers to the model. Each time a new layer is added, one of the polygons of the local layer geometry engine may be split into two new polygons. In addition, a user may be permitted to assign one or more attribute values to a new layer based upon the sensor data, or in some embodiments, attribute values may be assigned automatically, e.g., based upon an mean or median for the sensor data in the region of the subsurface formation corresponding to the area of the polygon for the new layer. In some embodiments, attributes representative of collected sensor data may also be displayed within the polygonal work zone to aid a user in interpreting the sensor data and identifying and/or adjusting the boundaries between layers. Attribute values, even if automatically assigned, may also be user editable in some embodiments.

Figure 13A:
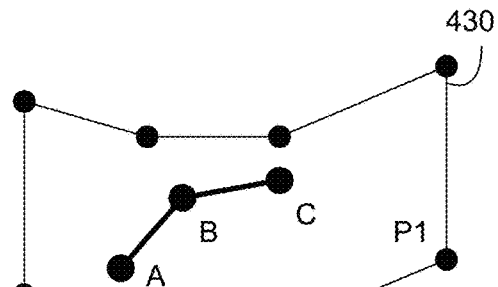
FIGS. 13A and 13B illustrate the addition of a new subsurface layer and the splitting of a polygonal work zone in accordance with implementations of various technologies and techniques described herein.
Figure 13B:
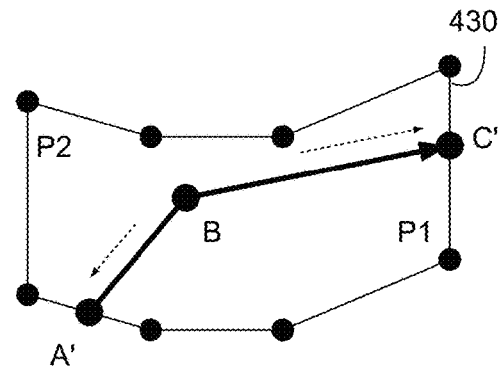

In some embodiments, new layers may only be added by splitting an existing polygon, such that all created polygons are added inside the base polygon using space partitioning. For example, FIG. 13A illustrates an example base polygon 430 (also designated as P1) and three points A, B and C created by a user. By dragging points A and C to the positions A' and C' in FIG. 13B (e.g., using a mouse), a new layer may be created, effectively resizing base polygon P1 and creating a new polygon P2. It will be appreciated that in some embodiments, where no layers have been created, splitting the base polygon 430 may result in the creation of two new layers.

Figure 14A:
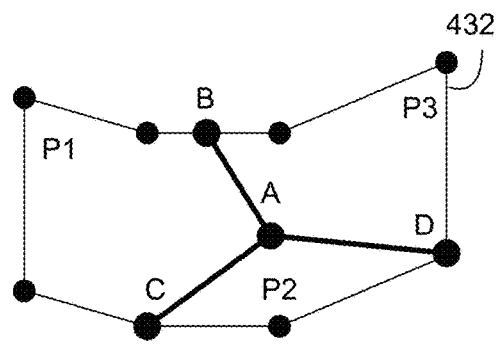
FIGS. 14A and 14B illustrate the movement of a point and the resulting modification of multiple polygons in response thereto in accordance with implementations of various technologies and techniques described herein.
Figure 14B:
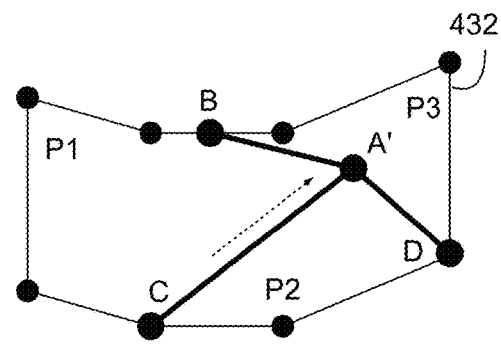
Figure 14C:
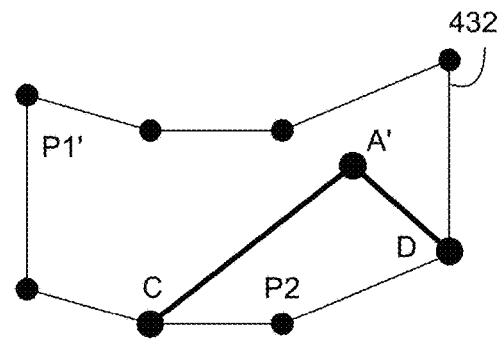
FIG. 14C illustrates the deletion of a segment [B,A'] from FIG. 14B and the resulting merging of multiple polygons in response thereto in accordance with implementations of various technologies and techniques described herein.

In addition, the geometry may be edited by a user, as illustrated by FIGS. 14A and 14B. A user may be permitted to operate on points, layers and/or polygons, e.g., by moving, adding, deleting and/or otherwise modifying points, layers and/or polygons. Since points are shared between polygons, moving or deleting a point may result in updates to any layers and/or polygons that share the point. For example, FIG. 14A illustrates a base polygon 432 that has been split into three polygons P1-P3 sharing a point A. Movement of point A to position A' as shown in FIG. 14B (e.g., by dragging with a mouse), results in updates to each of polygons P1-P3, as well as any layers defined by the boundaries between these polygons. Further, as illustrated in FIG. 14C, deletion of a segment [BA'] of FIG. 14B may result in merger of polygons P1 and P3 into a single polygon P1.

In some embodiments, rules may be enforced during editing by a user. For example, new layers may be required to be created by space partitioning another polygon. In addition, a polygon may not be permitted to be fully inside of another polygon, and must instead share at least one edge with an adjacent polygon. In addition, edges between points may not be permitted to cross. Other rules will be appreciated by one of ordinary skill in the art having the benefit of the instant disclosure.

It will therefore be appreciated that layers may be defined in some embodiments by polygons formed of a plurality of points. It will be appreciated, however, that a layer may be "defined" by a polygon or even by a plurality of boundaries simply by associating the coordinates of the points of the polygon/boundaries with the layer. The visualizations of layers using boundaries and/or polygons may therefore be generated dynamically based upon the stored point coordinates associated with the layers in some embodiments. Further, in many instances, one or more points defining a layer may be shared with a base polygon defining a polygonal work zone such that an edge of the polygon defining a layer may similarly extend along an edge of the polygonal work zone.

Figure 15:
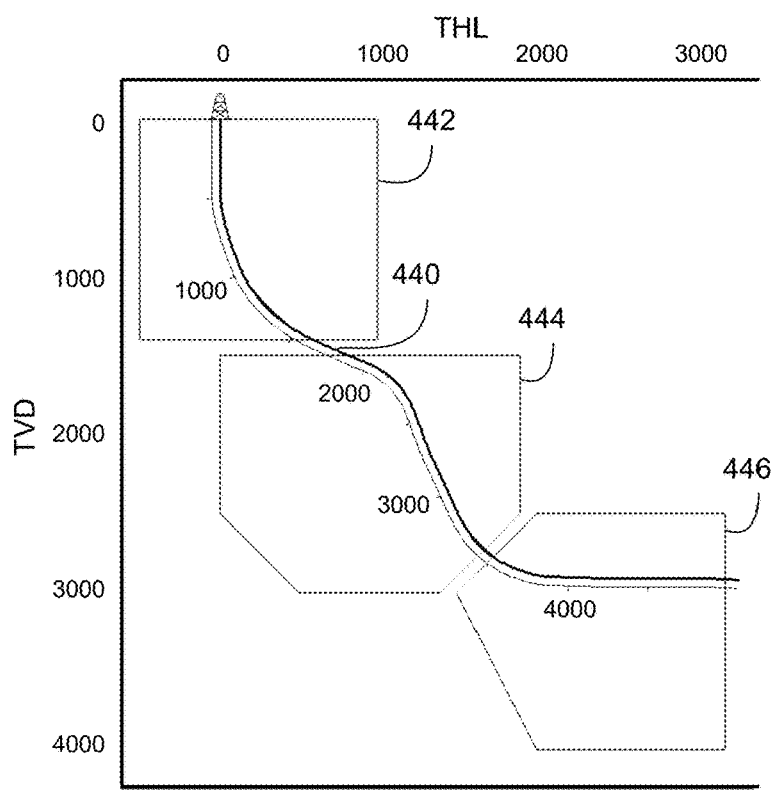
FIGS. 15 and 16 illustrate the creation of multiple polygonal work zones at different positions along a wellbore, with FIG. 15 additionally illustrating multiple subsurface layers defined within the multiple polygonal work zones.
Figure 16:
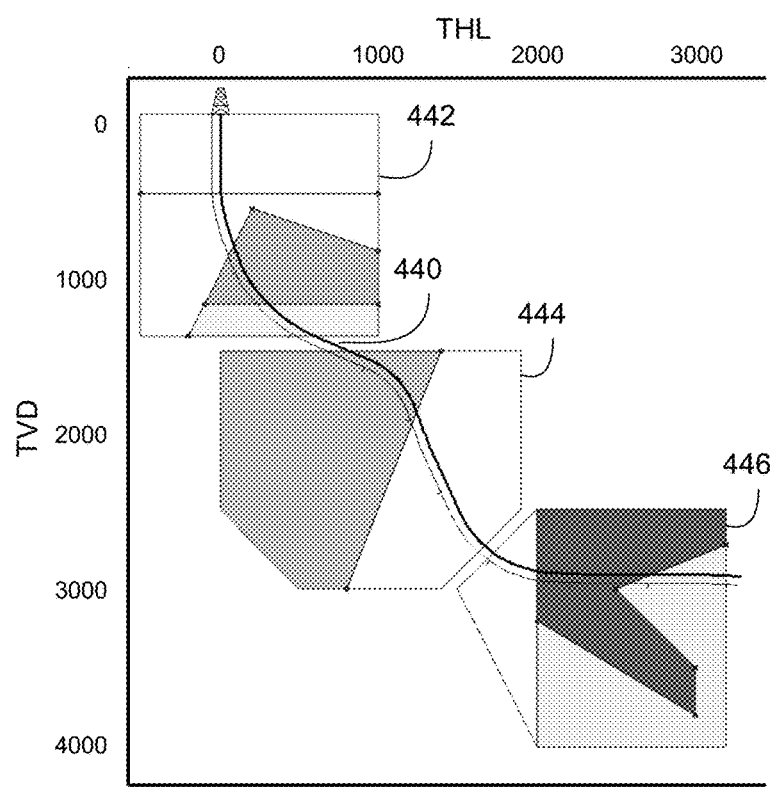

It may also be useful in some embodiments to work on multiple distinct work zones around a wellbore trajectory, e.g., by adding multiple base polygons (polygonal work zones) at different positions along the wellbore trajectory. In addition, adding a boundary may split a relevant base polygon. FIG. 15, for example, illustrates a wellbore 440 for which multiple base polygons 442, 444 and 446 have been defined, while FIG. 16 illustrates resulting layers created by a user and splitting each of the base polygons 442, 444 and 446 into multiple polygons. It will be appreciated that in each of these figures, THL refers to True Horizontal Length and TVD refers to True Vertical Depth.

Figure 17:
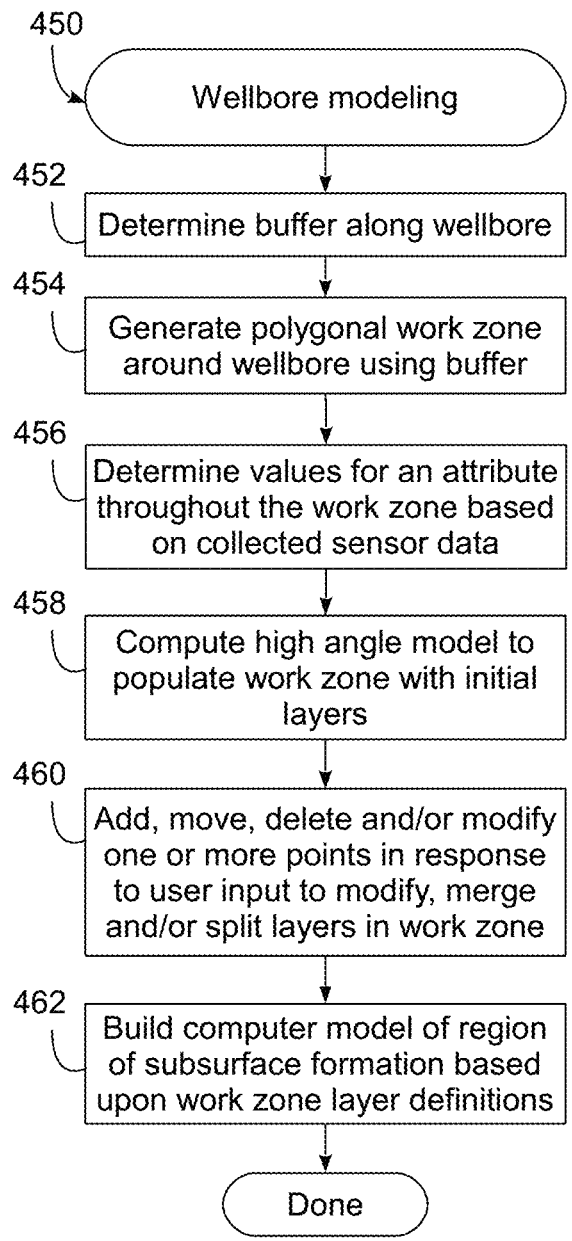
FIG. 17 illustrates an example sequence of operations for a formation modeling routine in accordance with implementations of various technologies and techniques described herein.

Now turning to FIG. 17, this figure illustrates an example routine 450 that may be performed, for example, by a local layer geometry engine in module 32 to perform formation modeling, e.g., in an interactive fashion with a user. In block 452, a buffer may be determined along a length of the wellbore, and then in block 454, a polygonal work zone may be created at a location or position along the wellbore corresponding to the determined buffer, and a visualization of the generated work zone may be displayed to a user on a computer display. Next, in block 456, values for a property or attribute of the formation, e.g., natural gamma ray, resistivity, horizontal resistivity, vertical resistivity, density, neutron porosity, velocity, nuclear magnetic resonance porosity, sigma, spectroscopy, sonic velocity, may be determined from sensor data collected from the wellbore in the region of the subsurface formation corresponding to the work zone, and displayed within the visualization of the work zone. Different values or ranges of values of an attribute may be displayed, for example, in different colors, shades or patterns to assist with visually distinguishing areas of the subsurface formation that are similar or different from one another based upon the values of the attributes, with areas sharing similar visual characteristics generally indicating the presence of relatively homogeneous layers or volumes in the subsurface formation. Attributes or properties may also be displayed adjacent a visualization of a work zone in some embodiments, e.g., to provide additional information useful in interpreting the sensor data.

Next, in block 458, a compute high angle model operation may be performed to populate the work zone with a set of polygons corresponding to an initial set of layers determined from the sensor data collected from the wellbore in the region of the subsurface formation corresponding to the work zone. It will be appreciated that the polygons may also be shaded, colored, or patterned to correlate each polygon with a value of one or more attributes determined from the collected sensor data. In addition, it will be appreciated that in some embodiments no automated determination of initial layers may be performed.

Next, in block 460, one or more points in one or more polygons defined in the work zone may be added, moved, deleted or otherwise modified in response to user input to modify, merge and/or split polygons and their associated layers within the polygonal work zone. Then, in block 462 a computer model may be built for the region of the subsurface formation corresponding to the work zone, based upon the configuration of the polygons representing the layer definitions for the subsurface formations. Routine 450 is then complete. In addition, in some embodiments, an interactive process may be used where the computer model is built and then revised one or more times based upon further user input, until the user is satisfied with the resulting model.

It will be appreciated that implementation of routine 450 in module 32 would be well within the abilities of one of ordinary skill in the art having the benefit of the instant disclosure. Furthermore, other routines and algorithms may be used in other embodiments of the invention, so the invention is not limited to the particular routine illustrated herein.

Various modifications may be made to the illustrated embodiments. As an example, a computer model may include layer attributes, boundary attributes, segment attributes and/or point attributes in different embodiment. In some embodiments, for example, attributes may be assignable to boundaries between layers and/or the segments and/or or points defining the boundaries between layers. Boundary and/or segment attributes may include, for example, "out of plane dip," among others. An attribute may be constant between different segments of a boundary in some embodiments, while in other embodiments, each segment may be assigned a different value for an attribute (e.g., where the out of plane dip varies for different segments.

While particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method for modeling a subsurface formation, comprising:
   generating, by a hardware processor, a work zone associated with a length of a wellbore for display on a computer display, wherein in a cross-sectional plane taken transverse to the wellbore, the work zone is a two-dimensional closed region;
   populating the work zone with attributes based on seismic sensor data collected along the length of the well bore;
   generating, by the hardware processor, a visualization of the work zone including a plurality of layers and boundaries respectively between the layers, the plurality of layers respectively being associated with the attributes; and
   building a computer model of a region of the subsurface formation based upon positions of the boundaries in the work zone.

2. The method of claim 1, wherein the work zone comprises a polygonal work zone.

3. The method of claim 2, wherein the generating includes generating the closed region to extend a predetermined distance transverse to the wellbore.

4. The method of claim 3, wherein the predetermined distance corresponds to a range of at least one sensor used to collect the seismic sensor data.

5. The method of claim 2, wherein the polygonal work zone is non-rectangular.

6. The method of claim 2, wherein
   the plurality of layers includes a first layer and a second layer,
   the plurality of boundaries includes a first boundary between the first layer and the second layer,
   the first boundary is defined by a plurality of points, and
   the visualization includes the plurality of points defining the first boundary in the work zone.

7. The method of claim 6, wherein the first boundary includes at least one edge extending between at least one pair of the plurality of points.

8. The method of claim 6, further comprising partitioning a polygon of the polygonal work zone into a first polygon and a second polygon, wherein the first and second layers are respectively defined by the first and second polygons, and wherein the plurality of points in the first boundary are shared by the first and second polygons.

9. The method of claim 8, further comprising updating the first and second polygons defining the first and second layers in response to user input that moves a first point among the plurality of points.

10. The method of claim 8, further comprising updating the first and second polygons defining the first and second layers in response to user input that deletes a first point among the plurality of points.

11. The method of claim 10, wherein updating the first and second polygons in response to user input that deletes the first point includes merging the first and second polygons and thereby merging the first and second layers.

12. The method of claim 8, further comprising creating a boundary in response to user input.

13. The method of claim 12, wherein
   the created boundary splits the second polygon defining the second layer, and
   creating the boundary comprises resizing the second polygon and creating a third polygon from a former portion of the second polygon to define a third layer among the plurality of layers.

14. The method of claim 8, wherein at least one edge of the first polygon extends along an edge of the polygonal work zone.

15. The method of claim 2, further comprising generating the boundaries between the plurality of layers based upon the seismic sensor data collected along the length of the wellbore.

16. The method of claim 15, wherein
   each of the plurality of layers is associated with a respective value for at least one of the attributes,
   generating the boundaries includes assigning the values for the attributes based upon the seismic sensor data collected along the length of the wellbore,
   generating the visualization includes associating the plurality of layers with colors, shades or patterns correlated to the respective values of the attributes, and
   the values of the attributes are user editable.

17. The method of claim 2, wherein generating the visualization is performed by the processor.

18. An apparatus, comprising:
   at least one processing unit; and
   program code configured upon execution by the at least one processing unit to model a subsurface formation using sensor data collected along a wellbore extending through the subsurface formation by performing the method of claim 1.

19. A program product, comprising:
   a computer readable medium; and
   program code stored on the computer readable medium and configured upon execution by at least one processing unit to model a subsurface formation using sensor data collected along a wellbore extending through the subsurface formation by performing the method of claim 1.

* * * * *